United States Patent
Peterson et al.

(10) Patent No.: US 9,238,979 B2
(45) Date of Patent: Jan. 19, 2016

(54) ENGINE BREATHING SYSTEM VALVE AND SEAL

(75) Inventors: Todd R. Peterson, New Boston, MI (US); Murray Busato, Clinton Township, MI (US)

(73) Assignee: BorgWarner Inc., Auburn Hills, MI (US)

(*) Notice: Subject to any disclaimer, the term of this patent is extended or adjusted under 35 U.S.C. 154(b) by 221 days.

(21) Appl. No.: 13/876,252

(22) PCT Filed: Oct. 3, 2011

(86) PCT No.: PCT/US2011/054594
§ 371 (c)(1),
(2), (4) Date: Mar. 27, 2013

(87) PCT Pub. No.: WO2012/047801
PCT Pub. Date: Apr. 12, 2012

(65) Prior Publication Data
US 2013/0186378 A1 Jul. 25, 2013

Related U.S. Application Data

(60) Provisional application No. 61/391,241, filed on Oct. 8, 2010.

(51) Int. Cl.
*F02B 23/00* (2006.01)
*F01L 1/00* (2006.01)
(Continued)

(52) U.S. Cl.
CPC ............. *F01L 1/00* (2013.01); *F02B 37/183* (2013.01); *F02D 9/106* (2013.01); *F02M 25/077* (2013.01);
(Continued)

(58) Field of Classification Search
CPC .......... F02M 21/00; F02M 2700/1305; F02M 25/10; F02M 25/00
USPC ........................................... 123/585
See application file for complete search history.

(56) References Cited

U.S. PATENT DOCUMENTS 2,331,641 A * 10/1943 Walker ..................... 277/347
6,443,135 B1 * 9/2002 Dismon et al. ........ 123/568.18

FOREIGN PATENT DOCUMENTS

| CN | 101349222 A | 1/2009 |
|---|---|---|
| CN | 101675218 A | 3/2010 |
| DE | 3425557 A1 | 1/1986 |
| JP | H09296867 A | 11/1997 |
| JP | 2000046200 A | 2/2000 |

(Continued)

OTHER PUBLICATIONS

International Search Report and Written Opinion ; date of mailing ,May 4,2012 ;for international application No. PCT/US2011/054594 ; 11 pages.

(Continued)

*Primary Examiner* — Lindsay Low
*Assistant Examiner* — Charles Brauch
(74) *Attorney, Agent, or Firm* — BrooksGroup (57) ABSTRACT

One embodiment may include a bushing (100, 300) and a seal member (102, 104, 200, 302). The bushing may be located in a cavity (56) of a stationary body (46) of an engine breathing system valve (12). The bushing may be located around a moveable stem (48) of the engine breathing system valve in order to facilitate movement of the valve. The seal member may be located in the cavity and around the stem. The seal member may substantially prevent fluid-flow between an outer diametrical surface (76) of the stem and a confronting inner diametrical surface (120, 128, 202, 308) of the seal member.

10 Claims, 4 Drawing Sheets

(51) Int. Cl.
- *F02B 37/18* (2006.01)
- *F02D 9/10* (2006.01)
- *F02M 25/07* (2006.01)
- *F16K 1/226* (2006.01)
- *F02M 25/10* (2006.01)
- *F02M 21/00* (2006.01)

(52) U.S. Cl.
CPC .............. *F16K 1/2268* (2013.01); *F02M 21/00* (2013.01); *F02M 25/10* (2013.01); *F02M 2700/1305* (2013.01); *Y02T 10/121* (2013.01); *Y02T 10/144* (2013.01)

(56) References Cited

FOREIGN PATENT DOCUMENTS

| | | |
|---|---|---|
| JP | 2005042845 A | 2/2005 |
| JP | 2005291129 A | 10/2005 |
| WO | 2008144686 A1 | 11/2008 |

OTHER PUBLICATIONS

Chinese Office Action dated May 13, 2015; Application No.201180044208.8 ; Applicant:BORGWARNER INC. ; 7 pages.
Chinese Office Action dated Oct. 22, 2014 ; Application No. 201180044208.8 ; Applicant: BorgWarner Inc. ; 14 pages.

* cited by examiner

ENGINE BREATHING SYSTEM VALVE AND SEAL

This application claims the benefit of U.S. Provisional Application Ser. No. 61/391,241 filed Oct. 8, 2010.

TECHNICAL FIELD

The technical field generally relates to valves that regulate fluid-flow in an internal combustion engine breathing system and to seals used with the valves.

BACKGROUND

Automotive internal combustion engines are often equipped with breathing systems to decrease emissions and increase engine efficiency. The breathing systems may include one or more turbochargers, one or more exhaust gas recirculation (EGR) assemblies, and other components. Valves and passages are commonly located throughout the breathing systems to regulate fluid-flow between the breathing system components.

SUMMARY OF SELECT EMBODIMENTS OF THE INVENTION

One embodiment includes a product which may include a bushing, a seal member, and a biasing member. The bushing may be located at a cavity of a stationary body of an engine breathing system valve. The bushing may be located around a moveable stem of the engine breathing system valve. The bushing may assist movement of the stem. The seal member may be located in the cavity and around the stem. The seal member may substantially prevent fluid-flow between an outer diametrical surface of the stem and a confronting inner diametrical surface of the seal member. The biasing member may be located in the cavity and around the stem. The biasing member may cause an axial surface of the seal member to bear against a confronting axial surface of the bushing in order to substantially prevent fluid-flow between the axial surfaces of the seal member and the bushing.

One embodiment includes a product which may include an engine breathing system valve, a bushing means, a first seal member, and a second seal member. The engine breathing system valve may comprise a body, a member, and a stem. The body may have a cavity. The member may be located in the body and may open and close a port in order to permit and prevent fluid-flow in the port. The stem may be connected to the member and may extend through the cavity. The stem may move in order to cause the member to open and close the port. The bushing means may be located at the cavity and around the stem. The bushing means may assist movement of the stem. The first seal member may be located in the cavity and around the stem. The first seal member may be located at a side of the bushing. The first seal member may form a first seal between an outer diametrical surface of the stem and a first inner diametrical surface of the first seal member. The second seal member may be located in the cavity and around the stem. The second seal member may be located at a side of the bushing. The second seal member may form a second seal between the outer diametrical surface of the stem and a second inner diametrical surface of the second seal member.

One embodiment includes a method. The method may include providing an engine breathing system valve. The engine breathing system valve may comprise a body, a member, and a stem. The body may have a cavity, and the member may be located in the body. The member may open and close a port in order to permit and prevent fluid-flow in the port. The stem may be connected to the member and may extend through the cavity. Movement of the stem may cause the member to open and close the port. The method may also include providing a bushing. The bushing may be located at the cavity and around the stem. The method may further include forming a first radial seal around an outer diametrical surface of the stem and at a side of the bushing. The method may include forming a second radial seal around the outer diametrical surface of the stem and at a side of the bushing. And the method may include forming an axial seal on an axial surface of the bushing and at a side of the bushing.

Other embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the present invention will become more fully understood from the detailed description and the accompanying drawings, wherein.

DETAILED DESCRIPTION OF ILLUSTRATIVE EMBODIMENTS

The following description of the embodiment(s) is merely illustrative in nature and is in no way intended to limit the invention, its application, or uses. Furthermore, cross-hatching or cross-sectional lines provided in the drawings is merely illustrative in nature and is not intended to emphasize a particular part or portion, and is not intended to designate a particular material for a particular part or portion.

The figures show illustrative embodiments and applications of an assembly 10 that may be used with an engine breathing system valve 12, and that may minimize or altogether prevent fluid-flow leakage between a body and a stem of the valve, while effectively facilitating movement therebetween. The assembly 10 may block or redirect an otherwise relatively direct potential fluid-flow leak path. And the assembly 10 may be suitable for use in relatively increased operating temperatures, and may be constructed and arranged to accommodate thermal expansion and contraction as may occur upon temperature fluctuations during use and non-use of the engine breathing system valve 12.

In the illustrated embodiments and applications, the assembly 10 has components with a generally annular and cylindrical shape which define various directions with respect to the shape. For example, radially refers to a direction that is generally along an imaginary radius of the shape, axially refers to a direction that is generally parallel to an imaginary center axis of the shape, and circumferentially refers to a direction that is generally along an imaginary circumference of the shape.

Figure 1:
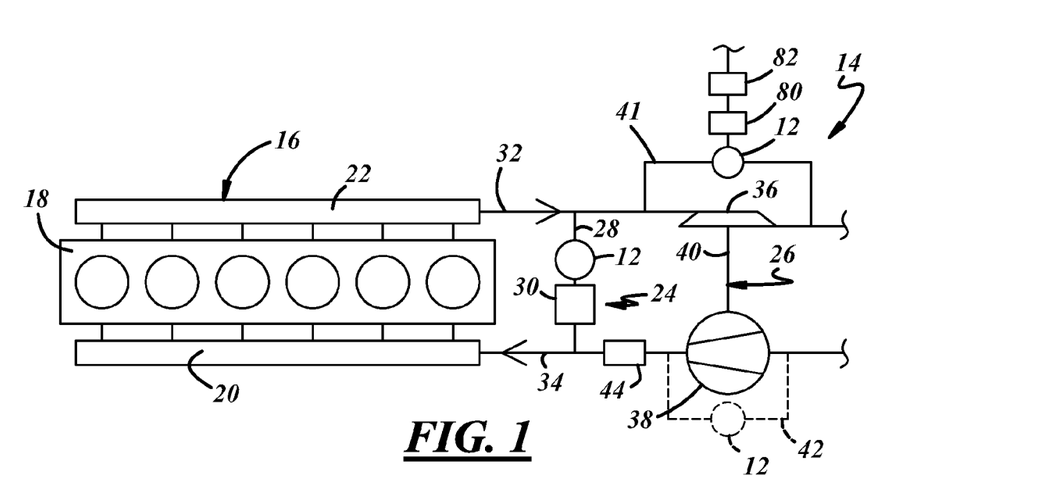
FIG. 1 is a schematic of an illustrative embodiment of an internal combustion engine breathing system.

Referring to FIG. 1, the engine breathing system valve 12 may be equipped at various locations in an engine breathing system 14 of an engine 16, such as an internal combustion engine like a gasoline, diesel, or alternative fuel engine. The engine 16 may combust fuel and expel fluid in the form of exhaust gasses to the engine breathing system 14. The engine 16 may be of different types having different arrangements and different numbers of cylinders (e.g., in-line, V-type, V-6, V-8, rotary, naturally aspirated, etc.). A cylinder block 18 may define multiple piston bores. An intake manifold 20 may be equipped on an intake side of the engine 16 to direct and supply air and/or air-fuel mixture to the engine. An exhaust manifold 22 may be equipped on an exhaust side of the engine 16 to direct fluid-flow, such as exhaust gasses and matter, exhaled from the engine and to the engine breathing system 14.

The engine breathing system 14 may be used to manage fluid-flow delivered to the engine 16 and expelled from the engine, and to decrease exhaust emissions and increase overall engine efficiency. The engine breathing system 14 may have various arrangements and various engine breathing system components. The example arrangement of FIG. 1 is meant only to show some of the fluid-flow relationship possibilities among components of the engine breathing system 14, and does not necessarily indicate direct or indirect connections or passages among the components. Other arrangements may exist and may depend on factors including the architecture, type, and desired performance of the engine 16. The example shown in FIG. 1 may include an engine gas recirculation (EGR) assembly 24 and a turbocharger 26.

The EGR assembly 24 may be used to recirculate and direct a measured amount of exhaust gas expelled from the engine 16 and to the intake side of the engine. Depending on the embodiment and circumstances, the recirculated exhaust gas may mix with incoming air and/or air-fuel mixture and may decrease or increase the combustion temperature taking place in the engine 16. The EGR assembly 24 may have various constructions, arrangements, and components. The example shown in FIG. 1 may include an EGR passage 28 that communicates fluid-flow between the exhaust and intake sides, an EGR cooler 30, and an EGR valve such as the engine breathing system valve 12 or another valve. The EGR cooler 30 may be a heat exchanger that cools the exhaust gasses that flow therethrough. The EGR valve regulates exhaust gas flow from an exhaust passage 32 and to an intake passage 34. The example EGR assembly 24 may be a high pressure EGR assembly; in other examples, a low pressure EGR assembly may also be included.

The turbocharger 26 may be driven by exhaust gas expelled from the engine 16 and may force an additional amount of air or air-fuel mixture into the engine to improve engine performance. The turbocharger 26 may come in various types including a fixed geometry turbocharger, a variable geometry turbocharger, a 1-stage turbocharger arrangement, a 2-stage turbocharger arrangement, or the like. The turbocharger 26 may include a turbine 36 that is directly driven by the exhaust gas flow and that in turn drives a compressor 38 via a common shaft assembly 40. The compressor 38 pressurizes air that eventually enters the engine 16. The turbocharger 14 may also include a bypass passage 41, or a waste gate, which diverts exhaust gasses around the turbine 36. A bypass valve, such as the valve 12 or another valve, may be located within the bypass passage 41 in order to regulate fluid-flow through the bypass passage. In some embodiments, another bypass passage 42 (shown in phantom) may be included to divert intake air around the compressor 38. Again, a bypass valve, such as the valve 12 or another valve, may be located within the bypass passage 42 to regulate fluid-flow through the bypass passage.

In other embodiments, the engine breathing system 14 may have more, less, and/or different components than shown and described. For example, one or more charge-air coolers 44 may be located between the components, a throttle valve may be included, an exhaust gas aftertreatment device may be included such as a diesel particulate filter (DPF) or a catalytic converter, and another turbocharger may be provided constituting a two-stage turbocharging arrangement.

The engine breathing system valve 12 may be used in the engine breathing system 14 at the various locations discussed above, and may be located at other places in the engine breathing system. The engine breathing system valve 12 may control and regulate fluid-flow in order to permit (open) fluid-flow therethrough or prevent (close) fluid-flow therethrough. The valve 12 may have various constructions, configurations, and components. The example valve 12 shown in FIG. 2 may include a valve body or housing 46, a stem or shaft 48, and a valve member or plate 50.

Figure 2:
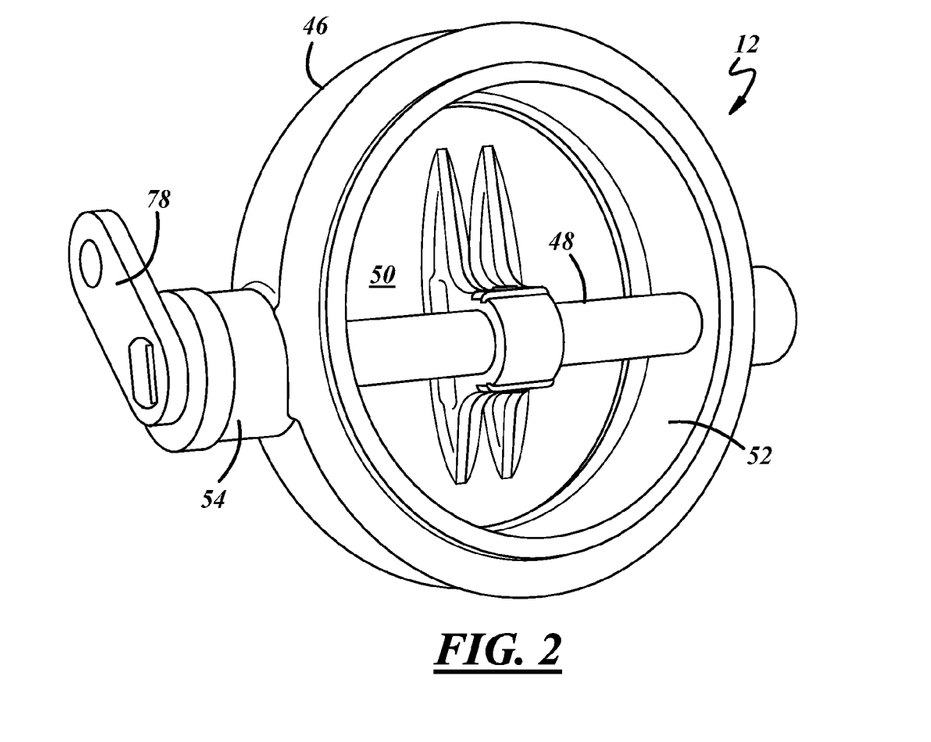
FIG. 2 is a perspective view of an illustrative embodiment of an engine breathing system valve.

The valve body 46 may constitute the casing through which fluid-flow travels in the engine breathing system valve 12. The valve body 46 may be a one-piece structure or may be made of separate pieces that are subsequently put together. The valve body 46 may be comprised of materials including, but not limited to, a ductile iron, a high silicon iron, a steel alloy such as a stainless steel, a ceramic, or a high temperature polymer such as a thermoset or thermoplastic. The valve body 46 may have a port 52 and may have a hub 54. During use, fluid-flow travels through the port 52, and the hub 54 may support and facilitate movement of the stem 48.

Figure 3:
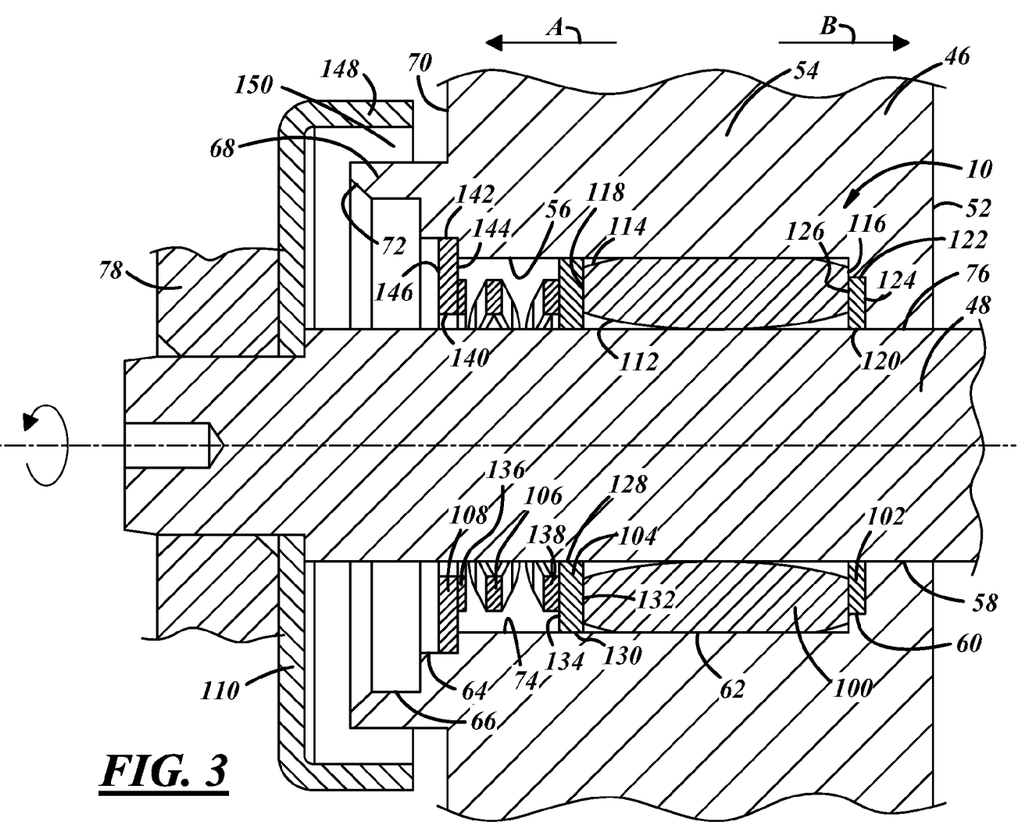
FIG. 3 is a cross-sectional view of an illustrative embodiment of a bushing and sealing assembly.

A cavity 56 may be located in the valve body 46 at the hub 54 or at another location, and may receive the stem 48 and may receive at least some of the components of the assembly 10. In general, the cavity 56 may be constructed and arranged in part for suitability with the assembly 10, and thus may have different constructions and arrangements depending on that of the assembly. In the example of FIG. 3, the cavity 56 may have a generally cylindrical shape with portions of different diameters or with different countersunk portions. A first portion 58 may have a first diameter that may be dimensioned to directly-circumferentially-surround the stem 48. A second portion 60 may have a second diameter that may be dimensioned to directly-circumferentially-surround a component of the assembly 10. A third portion 62 may have a third diameter that may be dimensioned to directly-circumferentially-surround more than one components of the assembly 10. A fourth portion 64 may have a fourth diameter that may be dimensioned to directly-circumferentially-surround a component of the assembly 10. And a fifth portion 66 may have a fifth diameter.

The cavity 56 may also have a flange 68 axially protruding in an outboard, or generally axially-outward, direction A for a distance away from an outside surface 70 of the valve body 46. The cavity 56 may have an open end 72 at the flange 68. And each portion 58, 60, 62, 64, 66 may have an inner diametrical surface 74 that may be radially-inwardly directed and may be circumferentially-continuous therearound.

Referring to FIGS. 2 and 3, the stem 48 may be a rod or other structure that may be carried by the valve body 46. The stem 48 may be connected to the valve member 50 and may translate movement to the valve member. The stem 48 may have an outer diametrical surface 76 that may be radially-outwardly directed and may be circumferentially-continuous therearound. Near an outboard free end of the stem 48, a lever 78 may be connected to the stem for movement by an actuator

80 (FIG. 1). The actuator 80 may selectively move (e.g., rotate) the stem 48 and the valve member 50 in order to open and close the port 52. The actuator 80 may be of various types including electromechanical such as an electric motor or solenoid, pneumatic, or hydraulic. The operation of the actuator 80 may be controlled by an electronic control unit (ECU) 82 (FIG. 1).

The valve member 50 may be rotated by the stem 48 in order to open and close the engine breathing system valve 12, and thus permit and prevent fluid-flow in the port 52. The valve member 50 and the stem 48 may be one-piece, or may be, as shown, separate pieces that are connected together. The valve member 50 may be shaped and dimensioned to complement that of the port 52; in this case the valve member may have a disc, ellipse, or oval shape.

The assembly 10 may minimize or substantially prevent fluid-flow leakage at the cavity 56 and between the valve body 46 and the stem 48. In the prior art, during use of an engine breathing system valve, fluid-flow such as exhaust gasses can in some cases leak from an inboard side at a port (also called the hot side), through a cavity, and to an outboard side of a valve body (also called an atmospheric side; the atmospheric side is not necessarily the atmosphere immediately outside of the associated automobile). And in some cases in the prior art, fluid-flow such as exhaust gasses like hydrocarbon and soot can get and leak between a stem and a bushing of an assembly, which could obstruct movement therebetween, damage the bushing, or both. The assembly 10 may be constructed and arranged to minimize or substantially prevent such potential leakage while limiting or avoiding obstructing the movement between the valve body 46 and the stem 48.

The assembly 10 may be suitable for use in applications subject to relatively increased operating temperatures, such as at the exhaust side of the engine breathing system 14 and particularly at the bypass passage 41 where temperatures can range between 800° C.-1100° C. for gasoline and diesel engines, for example, during use. In some cases, elastomeric seals, such as some comprised of fluorocarbon or fluorosilicone, may not always be suitable and effective in these applications of relatively increased operating temperatures.

As described, the assembly 10 may be used in, and as a part of, the engine breathing system valve 12. The assembly 10 may also be used in other valves and in other applications not necessarily described herein. For example, the assembly 10 may be used in, and as a part of, a valve with a stationary component (such as a body or housing) and a moveable component (such as shaft or stem); the moveable component may move by rotation or by back-and-forth linear reciprocation. The valve may be used in fluid-flow applications such as an engine breathing system application. The assembly 10 may have various constructions, arrangements, and components that may depend in part upon, among other factors, the valve in which the assembly is used, the application in which the valve is used, and the desired leak-prevention performance. In the illustrative embodiment of FIG. 3, the assembly 10 may include a bushing 100, a first seal member 102, a second seal member 104, a biasing member 106, a retainer 108, and a shield 110.

The bushing 100 may be located internally within the cavity 56 and may be located around the stem 48, and may support and facilitate movement of the stem. The bushing 100 may have various constructions and arrangements which may depend in part upon, among other factors, the movement (e.g., rotation, linear) of the stem 48. The bushing 100 may have a generally cylindrical shape and may be comprised of a metal. Referring to FIG. 3, the bushing 100 may have an inner diametrical surface 112 that may be radially-inwardly directed and may be circumferentially-continuous therearound. The inner diametrical surface 112 may directly confront the outer diametrical surface 76 of the stem 48. The bushing 100 may have an outer diametrical surface 114 that may be radially-outwardly directed and may be circumferentially-continuous therearound. The outer diametrical surface 114 may directly confront the inner diametrical surface 74 of the cavity 56. The bushing 100 may also have an inboard axial surface 116 that may be axially-inwardly directed (direction B), and may have an outboard axial surface 118 that may be axially-outwardly directed (direction A).

The first seal member 102 may be located at an inboard side of the bushing 100, and may be located internally within the cavity 56 and around the stem 48. The first seal member 102 may be used to substantially prevent fluid-flow between it and the stem 48. The first seal member 102 may have various constructions and arrangements which may depend in part upon, among other factors, the desired leak-prevention performance. The first seal member 102 may be constructed as an annular washer, and may be comprised of a metal material such as stainless steel. Referring to FIG. 3, the first seal member 102 may have an inner diametrical surface 120 that may be radially-inwardly directed and may be circumferentially-continuous therearound. The inner diametrical surface 120 may directly confront the outer diametrical surface 76 of the stem 48. The first seal member 102 may have an outer diametrical surface 122 that may be radially-outwardly directed and may be circumferentially-continuous therearound. The outer diametrical surface 122 may directly confront the inner diametrical surface 74 of the cavity 56. The first seal member 102 may also have an inboard axial surface 124 that may be axially-inwardly directed (direction B), and may have an outboard axial surface 126 that may be axially-outwardly directed (direction A). The inboard axial surface 124 may directly confront an opposing axial surface of the valve body 46, and the outboard axial surface 126 may directly confront the inboard axial surface 116 of the bushing 100.

The inner diametrical surface 120 may define an inner diameter that may provide a close-fit between the first seal member 102 and the stem 48. A first radial seal may be formed at a circumferential interface of the confronting inner diametrical surface 120 and outer diametrical surface 76. The first radial seal may be a metal-to-metal seal. The first radial seal may substantially prevent fluid-flow therebetween, meaning it may altogether prevent fluid-flow or a relatively minor and de minimis amount of fluid-flow may pass therethrough.

In one example, a first clearance may be defined between the inner diametrical surface 120 and the outer diametrical surface 76, while still substantially preventing fluid-flow as described. The first clearance may have a value ranging between about 0.015 mm to 0.025 mm, may have a value of about 0.020 mm, or may have another value. The first clearance may accommodate thermal expansion and contraction between the first seal member 102 and the stem 48 by providing a physical space between the seal member and the stem, and may accommodate assembly of the components. For example, in operating conditions with relatively increased temperatures, the inner diametrical surface 120 may come into direct contact with the outer diametrical surface 76, and the first seal member 102 may move (e.g., rotate) with the stem 48 and still may not substantially obstruct the stem's movement. In operating conditions with relatively decreased temperatures, on the other hand, the inner diametrical surface 120 may not make direct contact with the outer diametrical surface 76.

The outer diametrical surface 122 may define an outer diameter that may be less than that of the second diameter of the second portion 60. In one example, a second clearance may be defined between the outer diametrical surface 122 and the inner diametrical surface 74 of the cavity 56 at the second portion 60. The second clearance may have a value that is greater than that of the first clearance; for example, the second clearance may have a value ranging between about 0.10 mm-0.50 mm, or may have another value. The second clearance may accommodate thermal expansion and contraction between the first seal member 102 and the valve body 46. For example, in operating conditions with relatively increased and decreased temperatures, the outer diametrical surface 122 may not make direct contact with the inner diametrical surface 74 of the cavity 56, and may not substantially obstruct the stem's movement (e.g., binding).

The second seal member 104 may be similar in some ways to the first seal member 102. The second seal member 104 may be located at an outboard side of the bushing 100, and may be located internally within the cavity 56 and around the stem 48. The second seal member 104 may be used to substantially prevent fluid-flow between it and the stem 48. The second seal member 104 may have various constructions and arrangements which may depend in part upon, among other factors, the desired leak-prevention performance. The second seal member 104 may be constructed as an annular washer, and may be comprised of a metal material such as stainless steel. Referring to FIG. 3, the second seal member 104 may have an inner diametrical surface 128 that may be radially-inwardly directed and may be circumferentially-continuous therearound. The inner diametrical surface 128 may directly confront the outer diametrical surface 76 of the stem 48. The second seal member 104 may have an outer diametrical surface 130 that may be radially-outwardly directed and may be circumferentially-continuous therearound. The outer diametrical surface 130 may directly confront the inner diametrical surface 74 of the cavity 56. The second seal member 104 may also have an inboard axial surface 132 that may be axially-inwardly directed (direction B), and may have an outboard axial surface 134 that may be axially-outwardly directed (direction A). The inboard axial surface 132 may directly confront the outboard axial surface 118 of the bushing 100, and the outboard axial surface 134 may directly confront the biasing member 106.

The inner diametrical surface 128 may define an inner diameter that may provide a close-fit between the second seal member 104 and the stem 48. A second radial seal may be formed at a circumferential interface of the confronting inner diametrical surface 128 and outer diametrical surface 76. The second radial seal may be a metal-to-metal seal. The second radial seal may substantially prevent fluid-flow therebetween, meaning it may altogether prevent fluid-flow or a relatively minor and de minimis amount of fluid-flow may pass therethrough.

In one example, a third clearance may be defined between the inner diametrical surface 128 and the outer diametrical surface 76, while still substantially preventing fluid-flow as described. The third clearance may have a value ranging between about 0.015 mm to 0.025 mm, may have a value of about 0.020 mm, or may have another value. The third clearance may accommodate thermal expansion and contraction between the second seal member 104 and the stem 48 by providing a physical space between the seal member and the stem, and may accommodate assembly of the components. For example, in operating conditions with relatively increased temperatures, the inner diametrical surface 128 may come into direct contact with the outer diametrical surface 76, and the second seal member 104 may move (e.g., rotate) with the stem 48 and still may not substantially obstruct the stem's movement. In operating conditions with relatively decreased temperatures, on the other hand, the inner diametrical surface 128 may not make direct contact with the outer diametrical surface 76.

The outer diametrical surface 130 may define an outer diameter that may be less than that of the third diameter of the third portion 62. In one example, a fourth clearance may be defined between the outer diametrical surface 130 and the inner diametrical surface 74 of the cavity 56 at the third portion 62. The fourth clearance may have a value that is greater than that of the third clearance; for example, the fourth clearance may have a value ranging between about 0.10 mm-0.50 mm, or may have another value. The fourth clearance may accommodate thermal expansion and contraction between the second seal member 104 and the valve body 46. For example, in operating conditions with relatively increased and decreased temperatures, the outer diametrical surface 130 may not make direct contact with the inner diametrical surface 74 of the cavity 56, and may not substantially obstruct the stem's movement (e.g., binding).

The biasing member 106 may be located at the outboard side of the second seal member 104, and may be located internally within the cavity 56 and around the stem 48. The biasing member 106 may be used to exert an axially-directed force against the second seal member 104, and may urge the second seal member against the bushing 100. The inboard axial surface 132 of the second seal member 104 may thus bear directly against the outboard axial surface 118 of the bushing 100, and an axial seal may be formed at a planar interface of the confronting axial surfaces. The axial seal may be a metal-to-metal seal. The axial seal may substantially prevent fluid-flow therebetween. In one example, the biasing member 106 may exert a force equivalent to about 2 to 5 lbs of mass, or may exert another force. In different embodiments, the biasing member 106 may be a compression spring, a wave washer, or another suitable device which exerts a force. In the embodiment of FIG. 3, the biasing member 106 may be a compression spring that may have an outboard end 136 at the retainer 108 and may have an inboard end 138 at the second seal member 104. The outboard end 136 may bear directly against an axial surface of the retainer 108, and the inboard end 138 may bear directly against the outboard axial surface 134 of the second seal member 104. An axial seal may be formed at a respective interface of the outboard end 136 and the axial surface of the retainer 108, and of the inboard end 138 and the outboard axial surface 134. The axial seals may be a metal-to-metal seal, and the axial seals may substantially prevent fluid-flow therebetween.

The retainer 108 may be located at the outboard side of the biasing member 106, and may be located internally within the cavity 56 and around the stem 48. The retainer 108 may be immovably fixed in the cavity 56 at the fourth portion 64 via staking, welding, threading, or another suitable way. The retainer 108 may be used to keep the biasing member 106 inside of the cavity 56, and may provide a stationary component to which the biasing member can bear against. The retainer 108 may have various constructions and arrangements which may depend in part upon, among other factors, other components of the assembly 10 and the construction and arrangement of the cavity 56. The retainer 108 may be constructed as an annular washer, and may be comprised of a metal material such as stainless steel or a cold rolled steel. Still referring to FIG. 3, the retainer 108 may have an inner diametrical surface 140 that may be radially-inwardly directed and may be circumferentially-continuous therearound. The inner diametrical surface 140 may directly confront the outer diametrical surface 76 of the stem 48, and may be spaced a sufficient distance therefrom so that the surfaces do not make direct contact with each other and the movement of the stem is not obstructed thereby. The retainer 108 may have an outer diametrical surface 142 that may be radially-outwardly directed and may be circumferentially-continuous therearound. The outer diametrical surface 142 may be fixed directly to the inner diametrical surface 74 of the cavity 56. The retainer 108 may also have an inboard axial surface 144 that may be axially-inwardly directed (direction B), and may have an outboard axial surface 146 that may be axially-outwardly directed (direction A). The inboard axial surface 144 may directly confront the biasing member 106, and the outboard axial surface 146 may directly confront the shield 110.

The shield 110 may be located at the outboard side of the retainer 108, and may be located externally outside of the cavity 56. The shield 110 may be located near the open end 72, and may be immovably fixed to the stem 48. The shield 110 may be constructed and arranged to permit fluid-flow that exits the cavity 56 at the open end 72, and to prevent fluid-flow from entering the cavity at the open end. The shield 110 may also be constructed and arranged to prevent exhaust gasses from exiting the cavity 56 with direct exposure to immediately surrounding components such as wires. The shield 110 may have different constructions and arrangements. Referring to FIG. 3, the shield 110 may be generally shaped as a disc. The shield 110 may have a flange 148 that may be circumferentially-continuous and that may protrude in the inboard direction B. The flange 148 may be positioned with respect to the flange 68 in order to define a passage 150 therebetween. For example, the flange 148 may be spaced circumferentially around the flange 68 and by a radial distance from the flange 68; and the flange 148 may be spaced an axial distance from the outside surface 70 of the valve body 46. The passage 150 may make it easier for fluid-flow to exit the cavity 56 than for fluid-flow—such as contaminants and debris from the atmospheric side—to enter the cavity. The passage 150 may be defined in other ways.

In use, the assembly 10 may minimize or altogether prevent potential fluid-flow leakage from the port 52, through the cavity 56, and to the atmospheric side of the valve body 46. The assembly 10 may also effectively support and assist movement between the stem 48 and the valve body 46. The assembly 10 may force and guide fluid-flow that gets between the stem 48 and the valve body 46 to follow an indirect and labyrinth-like path through the cavity 56, as compared to a direct axial path in which fluid-flow primarily follows the outer diametrical surface 76 of the stem 48. The indirect path may make it harder for potential fluid-flow leakage to get to the atmospheric side, and may minimize or altogether prevent fluid-flow from getting between the stem 48 and the bushing 100.

For example, the indirect path may begin near the port 52 at an interface defined between the outer diametrical surface 76 of the stem 48 and the inner diametrical surface 74 of the cavity 56 at the first portion 58. The indirect path may then follow an interface defined between the inboard axial surface 124 of the first seal member 102 and the directly confronting axial surface of the valve body 46. The indirect path may then follow an interface defined between the outer diametrical surface 122 of the first seal member 102 and the inner diametrical surface 74 of the cavity 56 at the second portion 60. The indirect path may then follow an interface defined between the outboard axial surface 126 of the first seal member 102 and the inboard axial surface 116 of the bushing 100. The indirect path may then follow an interface defined between the outer diametrical surface 76 of the stem 48 and the inner diametrical surface 112 of the bushing 100. The indirect path may then follow an interface defined between the inboard axial surface 132 of the second seal member 104 and the outboard axial surface 118 of the bushing 100. The indirect path may then follow an interface defined between the outer diametrical surface 130 of the second seal member 104 and the inner diametrical surface 74 of the cavity 56 at the third portion 62. The indirect path may then follow an interface defined between the outboard axial surface 134 of the second seal member 104 and the inboard end 138 of the biasing member 106. The indirect path may then follow an interface defined between the outer diametrical surface 76 of the stem 48 and the confronting biasing member 106. The indirect path may finally follow a space defined between the inner diametrical surface 140 of the retainer 108 and the outer diametrical surface 76 of the stem 48.

In some cases, potential fluid-flow leakage may follow the indirect path, or at least a portion thereof, during use. In some cases, potential fluid-flow leakage may follow a different path, or may not make it all the way through the indirect path. For example, potential fluid-flow may follow an interface defined between the outer diametrical surface 114 of the bushing 100 and the inner diametrical surface 74 of the cavity 56; or potential fluid-flow may be altogether blocked at one of the interfaces such as at the interface defined between the inboard axial surface 124 of the first seal member 102 and the directly confronting axial surface of the valve body 46.

In tests using the assembly 10 illustrated in FIG. 3, fluid-flow leaked out of the cavity 56 to the atmospheric side at a mass flow rate between about 0.100 to 0.001 kg/hr. The tests used a stem 48 with a diameter of 10 mm, and applied 50 kPa of gauge pressure in the port 52. Of course, not all tests will yield these same results, and the results among different tests may be affected by, among other factors, the parameters such as the dimensions of the components and the temperatures under which the tests are performed.

Figure 4:
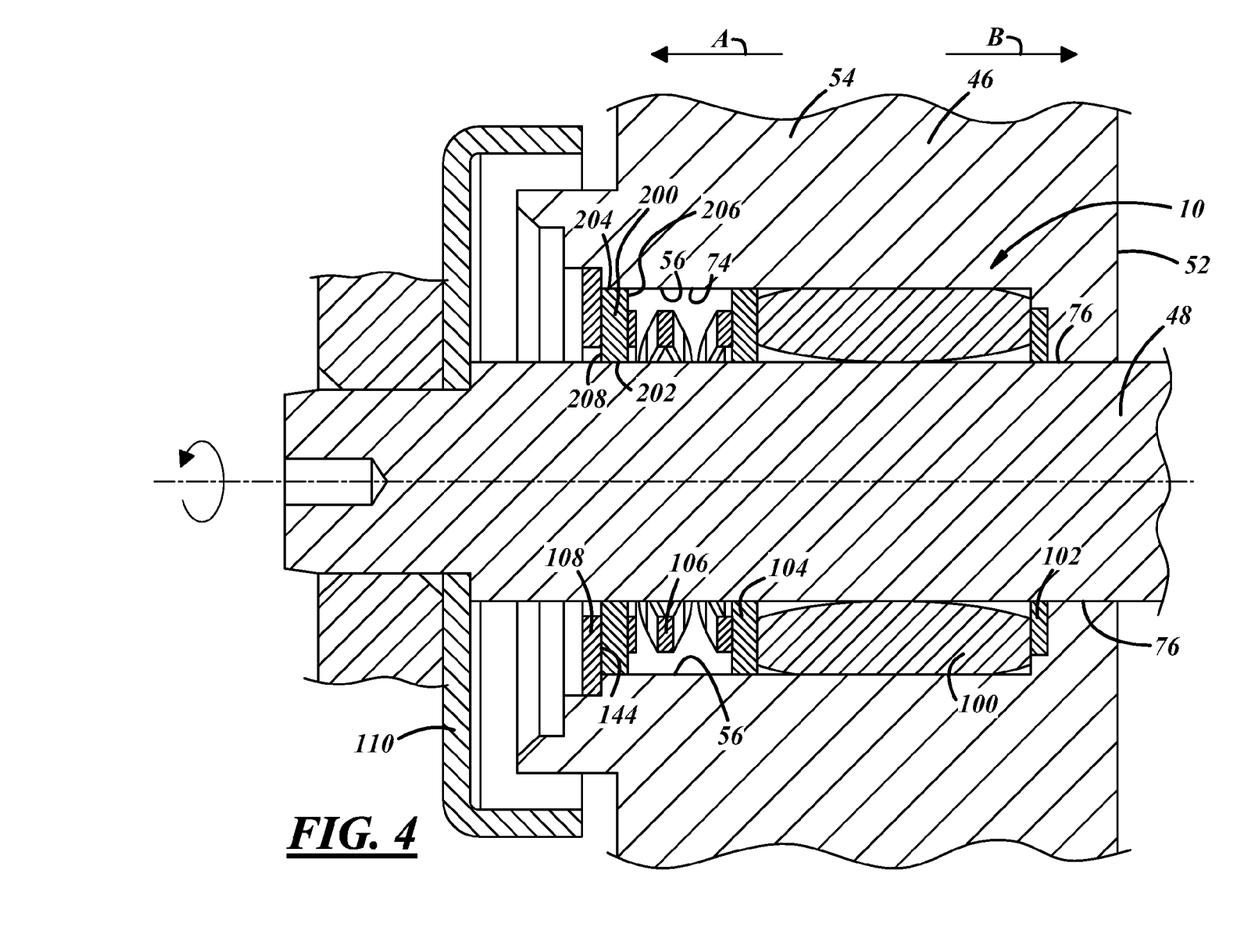
FIG. 4 is a cross-sectional view of an illustrative embodiment of a bushing and sealing assembly.

FIG. 4 illustrates another embodiment of the assembly 10. This embodiment is similar to the embodiment of FIG. 3, but includes a third seal member 200. The third seal member 200 may be similar to the second seal member 104. The third seal member 200 may be located at an outboard side of the biasing member 106, and may be located internally within the cavity 56 and around the stem 48. The third seal member 200 may be used to substantially prevent fluid-flow between it and the stem 48. The third seal member 200 may have various constructions and arrangements which may depend in part upon, among other factors, the desired leak-prevention performance. The third seal member 200 may be constructed as an annular washer, and may be comprised of a metal material such as stainless steel. The third seal member 200 may have an inner diametrical surface 202 that may be radially-inwardly directed and may be circumferentially-continuous therearound. The inner diametrical surface 202 may directly confront the outer diametrical surface 76 of the stem 48. The third seal member 200 may have an outer diametrical surface 204 that may be radially-outwardly directed and may be circumferentially-continuous therearound. The outer diametrical surface 204 may directly confront the inner diametrical surface 74 of the cavity 56. The third seal member 200 may also have an inboard axial surface 206 that may be axially-inwardly directed (direction B), and may have an outboard axial surface 208 that may be axially-outwardly directed (direction A). The inboard axial surface 206 may directly confront the biasing member 106, and the outboard axial surface 208 may directly confront the inboard axial surface 144 of the retainer 108.

The inner diametrical surface 202 may define an inner diameter that may provide a close-fit between the third seal member 200 and the stem 48. A third radial seal may be formed at a circumferential interface of the confronting inner diametrical surface 202 and outer diametrical surface 76. The third radial seal may be a metal-to-metal seal. The third radial seal may substantially prevent fluid-flow therebetween, meaning it may altogether prevent fluid-flow or a relatively minor and de minimis amount of fluid-flow may pass therethrough.

In one example, a fifth clearance may be defined between the inner diametrical surface 202 and the outer diametrical surface 76, while still substantially preventing fluid-flow as described. The fifth clearance may have a value ranging between about 0.015 mm to 0.025 mm, may have a value of about 0.020 mm, or may have another value. The fifth clearance may accommodate thermal expansion and contraction between the third seal member 200 and the stem 48 by providing a physical space between the seal member and the stem, and may accommodate assembly of the components. For example, in operating conditions with relatively increased temperatures, the inner diametrical surface 202 may come into direct contact with the outer diametrical surface 76, and the third seal member 200 may move (e.g., rotate) with the stem 48 and still may not substantially obstruct the stem's movement. In operating conditions with relatively decreased temperatures, on the other hand, the inner diametrical surface 202 may not make direct contact with the outer diametrical surface 76.

The outer diametrical surface 204 may define an outer diameter that may be less than that of the third diameter of the third portion 62. In one example, a sixth clearance may be defined between the outer diametrical surface 204 and the inner diametrical surface 74 of the cavity 56 at the third portion 62. The sixth clearance may have a value that is greater than that of the fifth clearance; for example, the sixth clearance may have a value ranging between about 0.10 mm-0.50 mm, or may have another value. The sixth clearance may accommodate thermal expansion and contraction between the third seal member 200 and the valve body 46. For example, in operating conditions with relatively increased and decreased temperatures, the outer diametrical surface 204 may not make direct contact with the inner diametrical surface 74 of the cavity 56, and may not substantially obstruct the stem's movement (e.g., binding).

In the embodiment of FIG. 4, the biasing member 106 may be used to exert an axially-directed force against the third seal member 200, and may urge the third seal member against the retainer 108. The outboard axial surface 208 of the third seal member 200 may thus bear directly against the inboard axial surface 144 of the retainer 108, and an axial seal may be formed at a planar interface of the confronting axial surfaces. The axial seal may be a metal-to-metal seal. The axial seal may substantially prevent fluid-flow therebetween. Furthermore, the outboard end 136 of the biasing member 106 may bear directly against the inboard axial surface 206, and an axial seal may be formed at an interface of the confronting surfaces. The axial seal may be a metal-to-metal seal, and may substantially prevent fluid-flow therebetween.

Also in the embodiment of FIG. 4, the indirect path may follow an interface defined between the inboard axial surface 206 of the third seal member 200 and the outboard end 136 of the biasing member 106. The indirect path may then follow an interface defined between the outer diametrical surface 204 of the third seal member 200 and the inner diametrical surface 74 of the cavity 56. The indirect path may then follow an interface defined between the outboard axial surface 208 of the third seal member 200 and the inboard axial surface 144 of the retainer 108.

Figure 5:
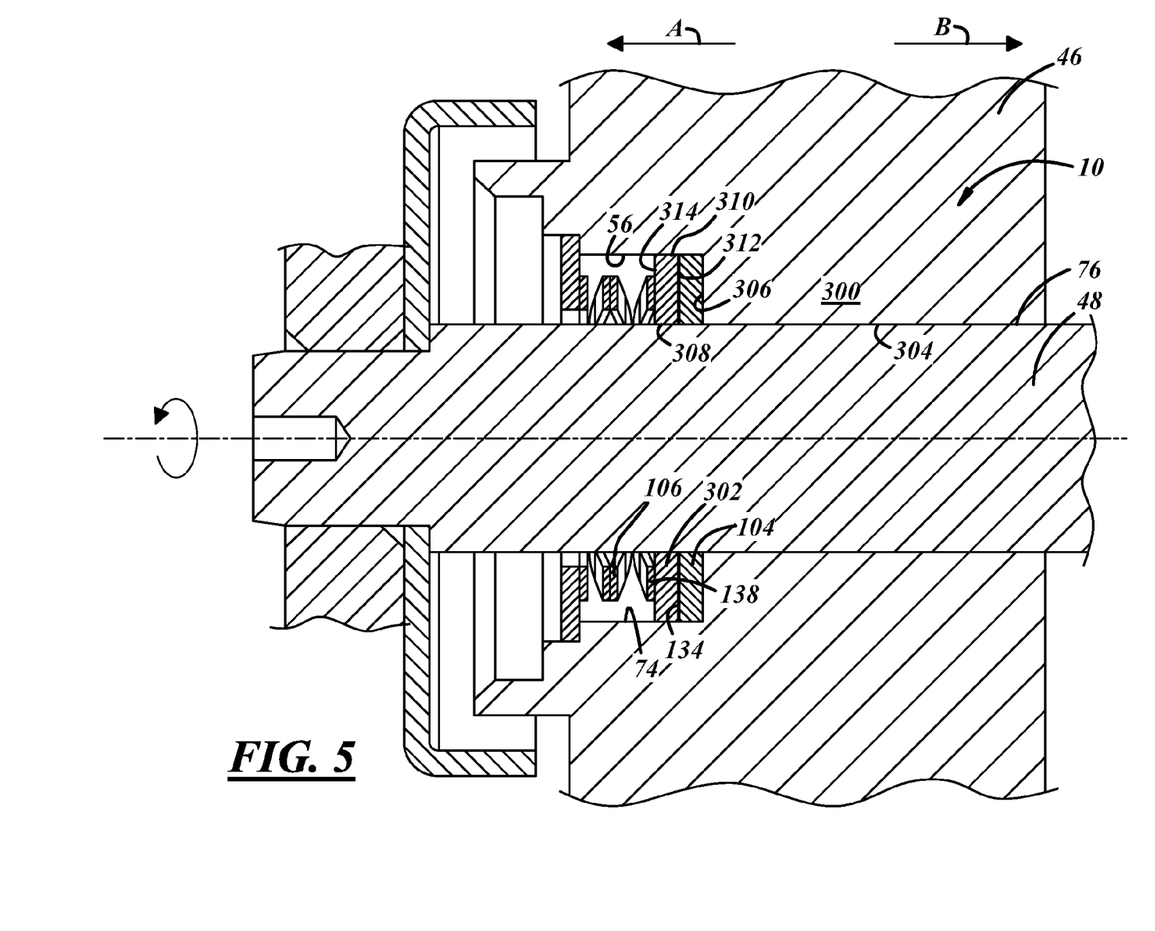
FIG. 5 is a cross-sectional view of an illustrative embodiment of a bushing and sealing assembly.

FIG. 5 illustrates another embodiment of the assembly 10. This embodiment is similar in some ways to the previously-described embodiments, but includes a bushing in the form of a portion 300 of the valve body 46 and includes a fourth seal member 302. The portion 300 may support and facilitate movement of the stem 48, and may, in a sense, replace the separate and distinct component bushing 100 of the previously-described embodiments. The portion 300 may be comprised of a material that facilitates movement of the stem 48, such as a polymer. The portion 300 may have an inner diametrical surface 304 that may be radially-inwardly directed and may be circumferentially-continuous therearound. The inner diametrical surface 304 may directly confront the outer diametrical surface 76 of the stem 48. The portion 300 may also have an outboard axial surface 306 that may be axially-outwardly directed (direction A).

The fourth seal member 302 may be similar to the second seal member 104. The fourth seal member 302 may be located at an immediate outboard side of the second seal member 104, and may be located internally within the cavity 56 and around the stem 48. The fourth and second seal members 302, 104 may constitute a stacked member assembly, meaning that the members directly neighbor and contact each other. The fourth seal member 302 may be used to substantially prevent fluid-flow between it and the stem 48. The fourth seal member 302 may have various constructions and arrangements which may depend in part upon, among other factors, the desired leak-prevention performance. The fourth seal member 302 may be constructed as an annular washer or a Belleville washer, and may be comprised of a metal material such as stainless steel.

The fourth seal member 302 may have an inner diametrical surface 308 that may be radially-inwardly directed and may be circumferentially-continuous therearound. The inner diametrical surface 308 may directly confront the outer diametrical surface 76 of the stem 48. The fourth seal member 302 may have an outer diametrical surface 310 that may be radially-outwardly directed and may be circumferentially-continuous therearound. The outer diametrical surface 310 may directly confront the inner diametrical surface 74 of the cavity 56. The fourth seal member 302 may also have an inboard axial surface 312 that may be axially-inwardly directed (direction B), and may have an outboard axial surface 314 that may be axially-outwardly directed (direction A). The outboard axial surface 314 may directly confront the biasing member 106, and the inboard axial surface 312 may directly confront the outboard axial surface 134 of the second seal member 104.

The inner diametrical surface 308 may define an inner diameter that may provide a close-fit between the fourth seal member 302 and the stem 48. A fourth radial seal may be formed at a circumferential interface of the confronting inner diametrical surface 308 and outer diametrical surface 76. The fourth radial seal may be a metal-to-metal seal. The fourth radial seal may substantially prevent fluid-flow therebetween, meaning it may altogether prevent fluid-flow or a relatively minor and de minimis amount of fluid-flow may pass therethrough.

In one example, a seventh clearance may be defined between the inner diametrical surface 308 and the outer diametrical surface 76, while still substantially preventing fluid-flow as described. The seventh clearance may have a value ranging between about 0.015 mm to 0.025 mm, may have a value of about 0.020 mm, or may have another value. The seventh clearance may accommodate thermal expansion and contraction between the fourth seal member 302 and the stem 48 by providing a physical space between the seal member and the stem, and may accommodate assembly of the components. For example, in operating conditions with relatively increased temperatures, the inner diametrical surface 308 may come into direct contact with the outer diametrical surface 76, and the fourth seal member 302 may move (e.g., rotate) with the stem 48 and still may not substantially obstruct the stem's movement. In operating conditions with relatively decreased temperatures, on the other hand, the inner diametrical surface 308 may not make direct contact with the outer diametrical surface 76.

The outer diametrical surface 310 may define an outer diameter that may be less than that of the diameter of the inner diametrical surface 74 of the cavity 56 thereat. In one example, an eighth clearance may be defined between the outer diametrical surface 310 and the inner diametrical surface 74. The eighth clearance may have a value that is greater than that of the seventh clearance; for example, the eighth clearance may have a value ranging between about 0.10 mm-0.50 mm, or may have another value. The eighth clearance may accommodate thermal expansion and contraction between the fourth seal member 302 and the valve body 46. For example, in operating conditions with relatively increased and decreased temperatures, the outer diametrical surface 310 may not make direct contact with the inner diametrical surface 74 of the cavity 56, and may not substantially obstruct the stem's movement (e.g., binding).

In the embodiment of FIG. 5, the biasing member 106 may be used to exert an axially-directed force against the fourth seal member 302, and may urge the fourth seal member against the second seal member 104. The inboard axial surface 312 of the fourth seal member 302 may thus bear directly against the outboard axial surface 134 of the second seal member 104, and an axial seal may be formed at a planar interface of the confronting axial surfaces. The axial seal may be a metal-to-metal seal. The axial seal may substantially prevent fluid-flow therebetween. Furthermore, the inboard end 138 of the biasing member 106 may bear directly against the outboard axial surface 314, and an axial seal may be formed at an interface of the confronting surfaces. The axial seal may be a metal-to-metal seal, and may substantially prevent fluid-flow therebetween.

Also in the embodiment of FIG. 5, the indirect path may follow an interface defined between the outer diametrical surface 310 of the fourth seal member 302 and the inner diametrical surface 74 of the cavity 56.

In the different embodiments of the FIGS. 3-5, the different components may be used with one another. For example, the portion 300 of FIG. 5 may be used only with the second seal member 104, the biasing member 106, and the retainer 108 of FIG. 3. And as another example, the stacked member assembly of FIG. 5 may be used only with the bushing 100, the first seal member 102, the biasing member 106, and the retainer 108 of FIG. 3.

Furthermore, the exact value of the various clearances described—including the first, second, third, fourth, fifth, sixth, seventh, and eighth clearance—may be dependent upon, among other factors, the materials used for the respective components and the expected thermal expansion and contraction. For example, if the first seal member 102 and the stem 48 are made of the same or a similar material, then the expected expansion and contraction is minimal, in which case the first clearance can be minimized in value.

In other embodiments not illustrated, the assembly may have different constructions, arrangements, and components. For example, the assembly may include a bushing and a single seal member (could be any one of the first, second, and third seal members), and need not include a biasing member. In another example, the assembly may include a bushing, a single seal member, and a biasing member located at the inboard side of the bushing. In another example, the seal members may have different dimensions with respect to one another. And in another example, other seals may be formed; a radial seal may be formed between an outer diametrical surface of a seal member and the inner diametrical surface of the cavity, an axial seal may be formed between an axial surface of a seal member and a directly confronting surface, or a combination thereof.

Numerous embodiments are within the scope of the invention including but not limited to the following.

Embodiment 1 may include a product comprising: a bushing (100, 300) located at a cavity (56) of a stationary body (46) of an engine breathing system valve (12), and located around a movable stem (48) of the engine breathing system valve (12), the bushing (100, 300) facilitating movement of the stem (48); a seal member (102, 104, 200, 302) located in the cavity (56) and around the stem (48), the seal member (102, 104, 200, 302) substantially preventing fluid-flow between an outer diametrical surface (76) of the stem (48) and a confronting inner diametrical surface (120, 128, 202, 308) of the seal member (102, 104, 200, 302); and a biasing member (106) located in the cavity (56) and around the stem (48), the biasing member (106) causing an axial surface (124, 126, 132, 134, 206, 208, 312, 314) of the seal member (102, 104, 200, 302) to bear against a confronting axial surface (116, 118, 306) of the bushing (100, 300) in order to substantially prevent fluid-flow between the axial surfaces.

Embodiment 2 may include a product as set forth in embodiment 1 wherein the seal member (102, 104, 200, 302) comprises a metal, a first clearance is defined between the confronting inner diametrical surface (120, 128, 202, 308) of the seal member (102, 104, 200, 302) and the outer diametrical surface (76) of the stem (48), a second clearance is defined between an outer diametrical surface (122, 130, 204, 310) of the seal member (102, 104, 200, 302) and a confronting inner diametrical surface (74) of the cavity (56), the first clearance has a value that is less than that of the second clearance.

Embodiment 3 may include a product as set forth in any of embodiments 1-2 wherein the value for the first clearance ranges between about 0.015 mm to 0.025 mm in order to accommodate thermal expansion and contraction between the seal member (102, 104, 200, 302) and the stem (48) upon temperature fluctuations during use and non-use, and in order to substantially prevent fluid-flow between the outer diametrical surface (76) of the stem (48) and the inner diametrical surface (120, 128, 202, 308) of the seal member (102, 104, 200, 302).

Embodiment 4 may include a product as set forth in any of embodiments 1-3 further comprising a second seal member (102, 104, 200, 302) located in the cavity (56) and around the stem (48), the second seal member (102, 104, 200, 302) substantially preventing fluid-flow between the outer diametrical surface (76) of the stem (48) and a confronting second inner diametrical surface (120, 128, 202, 308) of the second seal member (102, 104, 200, 302).

Embodiment 5 may include a product as set forth in any of embodiments 1-4 wherein the seal member (102, 104, 200, 302) is located at an outboard side of the bushing (100, 300) and the second seal member (102, 104, 200, 302) is located at an inboard side of the bushing (100, 300), the product comprising a retainer (108) fixed in the cavity (56), and the product comprising a third seal member (102, 104, 200, 302) located in the cavity (56) and around the stem (48), the third seal member (102, 104, 200, 302) substantially preventing fluid-flow between the outer diametrical surface (76) of the stem (48) and a confronting third inner diametrical surface (120, 128, 202, 308) of the third seal member (102, 104, 200, 302), the biasing member (106) causing an axial surface (124, 126, 132, 134, 206, 208, 312, 314) of the third seal member (102, 104, 200, 302) to bear against a confronting axial surface (144) of the retainer (108) in order to substantially prevent fluid-flow between the axial surfaces of the third seal member (102, 104, 200, 302) and of the retainer (108).

Embodiment 6 may include a product as set forth in any of embodiments 1-5 further comprising a shield (110) located at an open end (72) of the cavity (56), the shield (110) constructed and arranged to permit fluid-flow exiting the cavity (56) at the open end (72) and to substantially prevent fluid-flow entering the cavity (56) at the open end (72).

Embodiment 7 may include a product comprising: an engine breathing system valve (12) comprising a body (46), a member (50), and a stem (48), the body (46) having a cavity (56), the member (50) located in the body (46) and opening and closing a port (52) of the body (46) to permit and prevent fluid-flow in the port (52), the stem (48) connected to the member (50) and extending through the cavity (56), the stem (48) moving to cause the member (50) to open and close the port (52); a bushing means (100, 300) located at the cavity (56) and around the stem (48), the bushing means (100, 300) facilitating movement of the stem (48); a first seal member (102, 104, 200, 302) located in the cavity (56) and around the stem (48), the first seal member (102, 104, 200, 302) located at a side of the bushing means (100, 300), the first seal member (102, 104, 200, 302) forming a first seal between an outer diametrical surface (76) of the stem (48) and a first inner diametrical surface (120, 128, 202, 308) of the first seal member (102, 104, 200, 302); and a second seal member (102, 104, 200, 302) located in the cavity (56) and around the stem (48), the second seal member (102, 104, 200, 302) located at a side of the bushing means (100, 300), the second seal member (102, 104, 200, 302) forming a second seal between the outer diametrical surface (76) of the stem (48) and a second inner diametrical surface (120, 128, 202, 308) of the second seal member (102, 104, 200, 302).

Embodiment 8 may include a product as set forth in any of embodiments 1-7 further comprising a biasing member (106) located in the cavity (56) and around the stem (48), the biasing member (106) causing the second seal member (102, 104, 200, 302) to bear against the bushing means (100, 300) in an axially-inboard direction in order to form a third seal between an axial surface (124, 126, 132, 134, 206, 208, 312, 314) of the second seal member (102, 104, 200, 302) and a confronting axial surface (116, 118, 306) of the bushing means (100, 300).

Embodiment 9 may include a product as set forth in any of embodiments 1-8 further comprising a retainer (108) fixed in the cavity (56), the biasing member (106) located axially between the second seal member (102, 104, 200, 302) and the retainer (108).

Embodiment 10 may include a product as set forth in embodiments 1-9 further comprising a third seal member (102, 104, 200, 302) located in the cavity (56) and around the stem (48), the third seal member (102, 104, 200, 302) located axially between the biasing member (106) and the retainer (108), the third seal member (102, 104, 200, 302) forming a fourth seal between the outer diametrical surface (76) of the stem (48) and a third inner diametrical surface (120, 128, 202, 308) of the third seal member (102, 104, 200, 302), the biasing member (106) causing the third seal member (102, 104, 200, 302) to bear against the retainer (108) in an axially-outboard direction to form a fifth seal between an axial surface (124, 126, 132, 134, 206, 208, 312, 314) of the third seal member (102, 104, 200, 302) and a confronting axial surface (144) of the retainer (108).

Embodiment 11 may include a product as set forth in any of embodiments 1-10 further comprising a shield (110) located at an open end (72) of the cavity (56), the shield (110) constructed and arranged to permit fluid-flow exiting the cavity (56) at the open end (72) and to substantially prevent fluid-flow entering the cavity (56) at the open end (72).

Embodiment 12 may include a product as set forth in any of embodiments 1-11 wherein a first clearance is defined at the first seal and a second clearance is defined at the second seal, a third clearance is defined between a first outer diametrical surface (122, 130, 204, 310) of the first seal member (102, 104, 200, 302) and an inner diametrical surface (74) of the cavity (56), a fourth clearance is defined between a second outer diametrical surface (122, 130, 204, 310) of the second seal member (102, 104, 200, 302) and the inner diametrical surface (74) of the cavity (56), the first clearance has a value that is less than that of the third clearance, and the second clearance has a value that is less than that of the fourth clearance.

Embodiment 13 may include a product as set forth in any of embodiments 1-12 wherein the values for the first and second clearances range between about 0.015 mm to 0.025 mm in order to accommodate thermal expansion and contraction between the first and second seal members (102, 104, 200, 302) and the stem (48) upon temperature fluctuations during use and non-use of the product.

Embodiment 14 may include a method comprising: providing an engine breathing system valve (12) comprising a body (46), a member (50), and a stem (48), the body (46) having a cavity (56), the member (50) located in the body (46) and opening and closing a port (52) of the body (46) to permit and prevent fluid-flow in the port (52), the stem (48) connected to the member (50) and extending through the cavity (56), the stem (48) moving to cause the member (50) to open and close the port (52); providing a bushing (100, 300) located at the cavity (56) and around the stem (48); forming a first radial seal around an outer diametrical surface (76) of the stem (48) and at a side of the bushing (100, 300); forming a second radial seal around the outer diametrical surface (76) of the stem (48) and at a side of the bushing (100, 300); and forming an axial seal on an axial surface (116, 118, 306) of the bushing (100, 300) and at a side of the bushing (100, 300).

The above description of embodiments of the invention is merely illustrative in nature and, thus, variations thereof are not to be regarded as a departure from the spirit and scope of the invention.

What is claimed is:

1. A product comprising:
a bushing (100, 300) located at a cavity (56) of a stationary body (46) of an engine breathing system valve (12), and located around a movable stem (48) of the engine breathing system valve (12), the bushing (100, 300) facilitating movement of the stem (48);
a seal member (102, 104, 200, 302) located in the cavity (56) and around the stem (48), the seal member (102, 104, 200, 302) substantially preventing fluid-flow between an outer diametrical surface (76) of the stem (48) and a confronting inner diametrical surface (120, 128, 202, 308) of the seal member (102, 104, 200, 302);
a second seal member (102, 104, 200, 302) located in the cavity (56) and around the stem (48), the second seal member (102, 104, 200, 302) substantially preventing fluid-flow between the outer diametrical surface (76) of the stem (48) and a confronting second inner diametrical surface (120, 128, 202, 308) of the second seal member (102, 104, 200, 302);

wherein the seal member (102, 104, 200, 302) directly contacts an outboard side of the bushing (100, 300) and the second seal member (102, 104, 200, 302) directly contacts an inboard side of the bushing (100, 300); and a biasing member (106) located in the cavity (56) and around the stem (48), the biasing member (106) causing an axial surface (124, 126, 132, 134, 206, 208, 312, 314) of the seal member (102, 104, 200, 302) to bear against a confronting axial surface (116, 118, 306) of the bushing (100, 300) in order to substantially prevent fluid-flow between the axial surfaces wherein the seal member (102, 104, 200, 302) comprises a metal, a first clearance is defined between the confronting inner diametrical surface (120, 128, 202, 308) of the seal member (102, 104, 200, 302) and the outer diametrical surface (76) of the stem (48), a second clearance is defined between an outer diametrical surface (122, 130, 204, 310) of the seal member (102, 104, 200, 302) and a confronting inner diametrical surface (74) of the cavity (56), the first clearance has a value that is less than that of the second clearance.

2. A product as set forth in claim 1 wherein the value for the first clearance ranges between about 0.015 mm to 0.025 mm in order to accommodate thermal expansion and contraction between the seal member (102, 104, 200, 302) and the stem (48) upon temperature fluctuations during use and non-use, and in order to substantially prevent fluid-flow between the outer diametrical surface (76) of the stem (48) and the inner diametrical surface (120, 128, 202, 308) of the seal member (102, 104, 200, 302).

3. A product as set forth in claim 1 further comprising a retainer (108) fixed in the cavity (56), and the product comprising a third seal member (102, 104, 200, 302) located in the cavity (56) and around the stem (48), the third seal member (102, 104, 200, 302) substantially preventing fluid-flow between the outer diametrical surface (76) of the stem (48) and a confronting third inner diametrical surface (120, 128, 202, 308) of the third seal member (102, 104, 200, 302), the biasing member (106) causing an axial surface (124, 126, 132, 134, 206, 208, 312, 314) of the third seal member (102, 104, 200, 302) to bear against a confronting axial surface (144) of the retainer (108) in order to substantially prevent fluid-flow between the axial surfaces of the third seal member (102, 104, 200, 302) and of the retainer (108).

4. A product as set forth in claim 1 further comprising a shield (110) located at an open end (72) of the cavity (56), the shield (110) constructed and arranged to permit fluid-flow exiting the cavity (56) at the open end (72) and to substantially prevent fluid-flow entering the cavity (56) at the open end (72).

5. A product comprising:
an engine breathing system valve (12) comprising a body (46), a member (50), and a stem (48), the body (46) having a cavity (56), the member (50) located in the body (46) and opening and closing a port (52) of the body (46) to permit and prevent fluid-flow in the port (52), the stem (48) connected to the member (50) and extending through the cavity (56), the stem (48) moving to cause the member (50) to open and close the port (52);
a bushing (100, 300) located at the cavity (56) and around the stem (48), the bushing (100, 300) facilitating movement of the stem (48);
a first seal member (102, 104, 200, 302) located in the cavity (56) and around the stem (48), the first seal member (102, 104, 200, 302) directly contacting a first axial side of the bushing (100, 300), the first seal member (102, 104, 200, 302) forming a first seal between an outer diametrical surface (76) of the stem (48) and a first inner diametrical surface (120, 128, 202, 308) of the first seal member (102, 104, 200, 302); and
a second seal member (102, 104, 200, 302) located in the cavity (56) and around the stem (48), the second seal member (102, 104, 200, 302) directly contacting a second axial side of the bushing (100, 300), the second seal member (102, 104, 200, 302) forming a second seal between the outer diametrical surface (76) of the stem (48) and a second inner diametrical surface (120, 128, 202, 308) of the second seal member (102, 104, 200, 302) further comprising a biasing member (106) located in the cavity (56) and around the stem (48), the biasing member (106) causing the second seal member (102, 104, 200, 302) to bear against the bushing (100, 300) in an axially-inboard direction in order to form a third seal between an axial surface (124, 126, 132, 134, 206, 208, 312, 314) of the second seal member (102, 104, 200, 302) and a confronting axial surface (116, 118, 306) of the bushing (100, 300) further comprising a retainer (108) fixed in the cavity (56), the biasing member (106) located axially between the second seal member (102, 104, 200, 302) and the retainer (108).

6. A product as set forth in claim 5 further comprising a third seal member (102, 104, 200, 302) located in the cavity (56) and around the stem (48), the third seal member (102, 104, 200, 302) located axially between the biasing member (106) and the retainer (108), the third seal member (102, 104, 200, 302) forming a fourth seal between the outer diametrical surface (76) of the stem (48) and a third inner diametrical surface (120, 128, 202, 308) of the third seal member (102, 104, 200, 302), the biasing member (106) causing the third seal member (102, 104, 200, 302) to bear against the retainer (108) in an axially-outboard direction to form a fifth seal between an axial surface (124, 126, 132, 134, 206, 208, 312, 314) of the third seal member (102, 104, 200, 302) and a confronting axial surface (144) of the retainer (108).

7. A product as set forth in claim 6 further comprising a shield (110) located at an open end (72) of the cavity (56), the shield (110) constructed and arranged to permit fluid-flow exiting the cavity (56) at the open end (72) and to substantially prevent fluid-flow entering the cavity (56) at the open end (72).

8. A product as set forth in claim 5 wherein a first clearance is defined at the first seal and a second clearance is defined at the second seal, a third clearance is defined between a first outer diametrical surface (122, 130, 204, 310) of the first seal member (102, 104, 200, 302) and an inner diametrical surface (74) of the cavity (56), a fourth clearance is defined between a second outer diametrical surface (122, 130, 204, 310) of the second seal member (102, 104, 200, 302) and the inner diametrical surface (74) of the cavity (56), the first clearance has a value that is less than that of the third clearance, and the second clearance has a value that is less than that of the fourth clearance.

9. A product as set forth in claim 8 wherein the values for the first and second clearances range between about 0.015 mm to 0.025 mm in order to accommodate thermal expansion and contraction between the first and second seal members (102, 104, 200, 302) and the stem (48) upon temperature fluctuations during use and non-use of the product.

10. A method comprising:
providing an engine breathing system valve (12) comprising a body (46), a member (50), and a stem (48), the body (46) having a cavity (56), the member (50) located in the body (46) and opening and closing a port (52) of the body (46) to permit and prevent fluid-flow in the port (52), the stem (48) connected to the member (50) and extending through the cavity (56), the stem (48) moving to cause the member (50) to open and close the port (52);

providing a bushing (100, 300) located at the cavity (56) and around the stem (48);

forming a first radial seal around an outer diametrical surface (76) of the stem (48) and at a first side of the bushing (100, 300);

forming a second radial seal around the outer diametrical surface (76) of the stem (48) and at a second side of the bushing (100, 300); and forming a first axial seal on a first axial surface (116, 118, 306) of the bushing (100, 300) and at the first side of the bushing (100, 300) and a second axial seal on a second axial surface (116, 118, 306) of the bushing (100, 300) and at the second side of the bushing (100, 300), wherein a seal member (102, 104, 200, 302) comprises a metal, a first clearance is defined between the confronting inner diametrical surface (120, 128, 202, 308) of the seal member (102, 104, 200, 302) and the outer diametrical surface (76) of the stem (48), a second clearance is defined between an outer diametrical surface (122, 130, 204, 310) of the seal member (102, 104, 200, 302) and a confronting inner diametrical surface (74) of the cavity (56), the first clearance has a value that is less than that of the second clearance.

* * * * *